US006931059B1

(12) United States Patent
Van Dusen et al.

(10) Patent No.: US 6,931,059 B1
(45) Date of Patent: Aug. 16, 2005

(54) RATE AND DELIVERY TIME MULTIPLEXING FOR BANDWIDTH OPTIMIZATION

(75) Inventors: Charles H. Van Dusen, Beaverton, OR (US); Mayer D. Schwartz, Portland, OR (US); Guoyao Yu, Portland, OR (US)

(73) Assignee: Tut Systems, Inc., Pleasanton, CA (US)

( * ) Notice: Subject to any disclaimer, the term of this patent is extended or adjusted under 35 U.S.C. 154(b) by 785 days.

(21) Appl. No.: 09/616,109

(22) Filed: Jul. 14, 2000

(51) Int. Cl.[7] .............................................. H04N 7/18

(52) U.S. Cl. ............................. 375/240.02; 375/240.04

(58) Field of Search ....................... 375/240.02–240.07, 375/240.25–240.29; 348/713–719

(56) References Cited

U.S. PATENT DOCUMENTS 6,275,536 B1 *  8/2001  Chen et al. ............ 375/240.25
6,351,471 B1 *  2/2002  Robinett et al. ............ 370/468

* cited by examiner

Primary Examiner—Andy Rao
(74) Attorney, Agent, or Firm—Smith-Hill and Bedell

(57) ABSTRACT

A rate and delivery time multiplexing for bandwidth optimization algorithm has an allocation portion and a transrating portion. The allocation portion determines how many bits are available for each group of pictures in each program stream that is to be inserted into an outgoing MPEG Transport Stream (MTS). Based upon the allocated bits the transrating portion, when necessary, further compresses the program streams either in the compressed domain when rate reduction is minimal or in the pixel domain when rate reduction is significant. The result is the ability to transmit more video program streams over a given fixed bandwidth pipe for a given level of acceptable picture degradation.

20 Claims, 6 Drawing Sheets

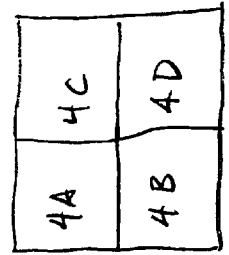
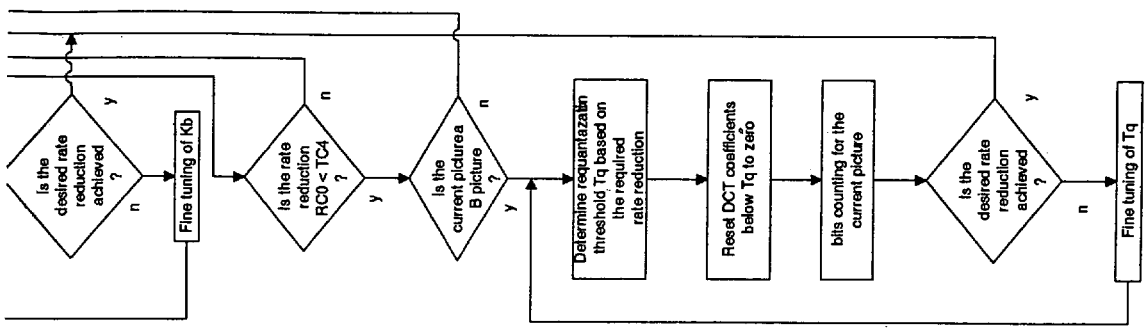
FIG. 4D
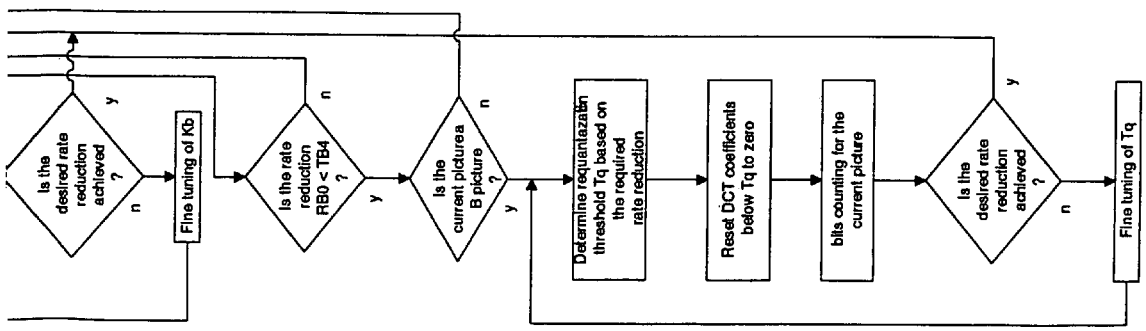

RATE AND DELIVERY TIME MULTIPLEXING FOR BANDWIDTH OPTIMIZATION

BACKGROUND OF THE INVENTION

The present invention relates to compressed video processing, and more particularly to a method of rate and delivery time multiplexing for bandwidth optimization.

In the transmission of video signals over physical transmission links, or pipes, the desire is to transmit as many of such video signals as possible through the pipes. To accomplish this objective video compression techniques, such as JPEG or MPEG, are used. These compression techniques are lossy in that some degradation of the video signal occurs between the encoding and decoding of the video signals. Thus the amount of compression a video signal is subjected to is a tradeoff between bandwidth and picture degradation, or what an end user or subscriber will tolerate. If the picture is compressed too much, the subscriber will object to the picture degradation. If the picture is not compressed enough, then the number of video signals that may be transmitted over the pipe is not optimized. The more complex the picture, the more bandwidth is required to avoid undesirable amounts of picture degradation.

For transmission networks optical fiber pipes provide wide bandwidth so that many video signals may be transmitted over great distances simultaneously. This optical physical medium generally is used for the backbone of the transmission network, but does not cover the "last mile" to the subscriber's location. This last mile is generally completed using a copper connection, such as twisted pair telephone cables. The bandwidth of the copper connection, or pipe, is much less than that of the optical pipe, and any signals in the copper pipe attenuate rapidly with distance. For example, very high bit rate digital subscriber line (VDSL) technology supports very high bit rates, up to 55 Mbps downstream from a head end to a subscriber and 19 Mbps upstream from the subscriber to the head end, and is intended for deployment over relatively short copper loops of 1000 to 4000 feet. On the other hand asymmetric digital subscriber line (ADSL) technology allows the use of one existing twisted pair local loop to provide high bandwidth data and/or video services. ADSL supports two-way transmission of analog voice (plain old telephony service — POTS), a downstream-only digital broadband channel of up to 9 Mbps for data or video distribution, and an upstream-only digital channel of up to 640 Kbps. ADSL deployment may be used over a range up to 12,000 feet, but is typically used for data only or only one video signal.

With VDSL technology current service providers are able to transmit to a single subscriber up to three video signals simultaneously. However only those subscribers close to the head end or a remote terminal may benefit from this technology. What is desired is to be able to provide the same ability of transmitting up to three video signals per subscriber on a physical transmission medium having less bandwidth so as to cover more subscribers over a greater area.

In the MPEG compression scheme every outgoing byte of data belongs to a transport stream packet, and for every program in the transport stream every outgoing byte has a time associated with that transport stream's clock. Thus if there are ten programs, every byte has one of ten different times, each one associated with a different program clock. (See Section 2.4.2.2 of ISO 13818-1 for details). In addition every byte has a time associated with its output clock. GOP refers not only to a group of pictures, but also to a complete sequence when there is no group of pictures—such is the case with video from some content services, such as HITS, where each new sequence is 15 pictures in length and has no I frames, only P and B frames with intra-coded slices ordered as PBBPBBPBB . . .

There is a fixed bandwidth pipe which supports a constant number of MPEG Transport Stream (MTS) packets per second. There are N single program transport streams as input, either variable bit rate (VBR) or constant bit rate (CBR), which are required to be multiplexed into the CBR outgoing MTS. N is not necessarily a constant. The desire is to optimize N for the given MTS.

BRIEF SUMMARY OF THE INVENTION

Accordingly the present invention provides rate and delivery time multiplexing for bandwidth optimization of a transmission pipe having a limited bandwidth to increase the number of signals that may be transmitted upon demand to a subscriber. The algorithm of the present invention has an allocation portion and a transrating portion. The allocation portion of the algorithm determines how many bits for each group of pictures for each of the program streams being inserted into an outgoing MPEG Transport Stream (MTS) are available. Bits may be borrowed from a future group of pictures or from non real-time data. If the total available bits after borrowing is less than the total number of bits for the total groups of pictures in each iteration, then an allocation function is applied to reduce the number of bits for each group of pictures—otherwise the groups of pictures are inserted into the outgoing MTS. If bit reduction is required, then the transrating portion of the algorithm is used to reduce the bit rates for each program stream as necessary to achieve the bit allocation from the allocation portion of the algorithm. If the bit reduction is minimal, then bit transrating occurs in the compressed domain by discarding specified discrete cosine transform (DCT) coefficients for the high frequencies or by requantization. If the bit reduction is high, then full decoding and encoding occurs to achieve the bit allocation. If the bit reduction is too high so as to cause unacceptable degradation of the video images, then one of the program streams may deleted according to a subscriber profile and the algorithm is run for the remaining streams.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 1 is a block diagram view of a representative video transmission system.

DETAILED DESCRIPTION OF THE INVENTION

Figure 2:
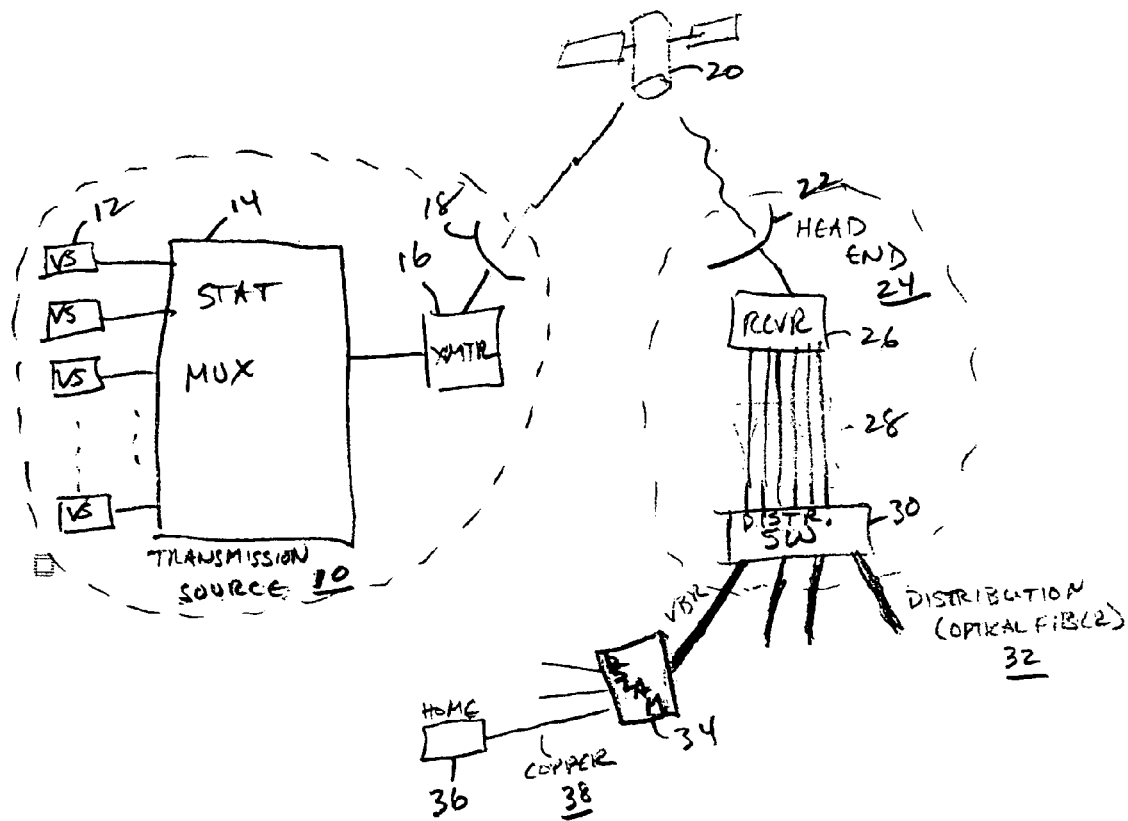
FIG. 2 is a timing diagram view illustrating bit allocation according to the present invention.

Referring now to FIG. 1 at a transmission source 10 a plurality of video programs 12 are input to a statistical multiplexer 14 to provide a wideband transmission stream to a transmitter 16. The output from the transmitter 16 may be transmitted over suitable means, such as uplinking via an antenna 18 to a satellite 20 and then downlinking to another antenna 22 at a distribution head end 24. The downlinked signal is input via the antenna 22 to a receiver 26 and then to a demultiplexer 28 for dividing the stream into single program transmission streams (SPTS) and removing null packets. The resulting SPTSs from the demultiplexer 28 are input to a distribution switch 30 for distribution over a local network 32, usually using optical fiber as the physical medium. At a subscriber distribution point the optical fiber is terminated in a digital subscriber line access multiplexer (DSLAM) 34. From the DSLAM 34 to a subscriber's location 36, i.e., the "last mile", a copper pipe 38 is used, such as twisted pair telephone cable.

In operation the subscriber from the subscriber's location 36 transmits a data request upstream to the DSLAM 34 indicating what services the subscriber desires. The following description is with respect to an ADSL service which has approximately 6–8 Mbps bandwidth for transporting selected video, audio and data signals downstream from the DSLAM 34. A subscriber at the subscriber location 36 initiates an upstream message to the DSLAM 34 indicating what video programs A, B and C are desired. The selected SPTSs, together with audio and non realtime data such as that provided by an internet service provider (ISP) which is not part of the MTS, pursuant to the subscriber's request are packetized into an MPEG Transport Stream (MTS) by a local stat mux in the DSLAM 34, the MTS being transmitted to the subscriber's location 36 over the copper pipe 38.

The algorithm for the stat mux in the DSLAM 34 has two portions—a bit allocation portion and a transrating portion, if necessary. The bit allocation portion looks over a region of consideration for each program stream to be incorporated into the outgoing MTS, the region of consideration including at least one group of pictures (GOP) from each program. The total number of bits for the complete GOPs within the region of consideration are determined and compared with a number of available bits for the iteration of the allocation portion for this region of consideration. If the total number of bits for the GOPs is less than or equal to the number of available bits, then the GOPs are inserted into the outgoing MTS packets and the transrating portion of the algorithm is bypassed.

If the total number of bits is greater than the number of available bits, then bits are borrowed from a borrowed bit pool. The borrowed bit pool includes non real-time data bits, such as Web data or other Internet data including documents. Bits may also be borrowed from the GOPs included in a next iteration of the next region of consideration. The borrowed bits, which include the non real-time data bits and may include some bits from future GOPs, are added to the number of available bits and, if the total number of bits for the GOPs is now less than or equal to the modified number of available bits, the GOPs are inserted into the outgoing MTS packets, again bypassing the transrating portion of the algorithm.

If however the total number of bits of the GOPs still exceeds the number of available bits, then a bit allocation function is used to determine how much each GOP needs to be reduced. The simplest allocation function is one where an equal percentage of bits is reduced from each COP in the region of consideration. However other allocation functions may be used—a priority may be assigned which limits the minimum bit rate for one program stream, such as for sporting events, and the other program streams are then equally allocated to the remaining available bits.

As an example of the allocation portion of the algorithm, for a pipe where 5 Mbps are allocated for video and each GOP of three program streams has a number of bits corresponding to 1.5 Mbps, then the total bit rate for all three GOPs is 4.5 Mbps, and no allocation or borrowing of bits is required. If one program stream has a number of bits corresponding to 2.5 Mbps and the other two have a number of bits corresponding to 1.5 Mbps, then the total bit rate is 5.5 Mbps, which is greater than the bit rate determined by the number of available bits. However by borrowing the data bits and up to 10% of the bits for the next iteration, the total number of available bits may be increased to a corresponding 5.5 Mbps, which is equal to the total equivalent bit rate required. Finally if the number of bits for the three program streams correspond to 3.0, 1.5, and 1.5, then the 6 Mbps is greater than the 5.5 Mbps equivalent available bit rate so further bit reduction is necessary, determined according to the allocation function.

The first step of the allocation portion of the algorithm is to calculate the number of available bits for each GOP in each outgoing program stream for the outgoing CBR MTS from the DSLAM 34 to the subscriber's location 36. The stream picked initially is the one with the highest priority, or is picked arbitrarily if all streams are of equal priority. By convention the picked stream has an index of "1". If an incoming stream GOP fits, then the GOP is placed in the appropriate outgoing MTS packets. However if the incoming GOP does not fit, then the video is adjusted to make the GOP fit. There is a borrowed bit pool by which bits, which could be used for sending non-real time data, are borrowed to accommodate particularly difficult to transrate video sequences.

The following notation is used in the following description.

$DTS_i(n)$ is the decoding time stamp with respect to the system clock of program i of the first picture of GOP n of the video elementary stream in program i which indicates the time that the GOP n is to be decoded in a system target decoder.

$In_i(t)$ is the index of the outgoing MTS packet of the statistically multiplexed stream whose outgoing byte time with respect to the system clock of program i includes t.

$p(k)$ is the $k^{th}$ outgoing MTS packet of the statistically multiplexed stream.

$t(k)$ is the time of $p(k)$ with respect to the output clock.

$t_i(k)$ is the time of $p(k)$ with respect to the system clock of program i.

$borrowed\_bits_n$ is the number of bits in the borrowed bit pool after iteration n of processing.

$potential\_bits_n$ is the number of bits which may be borrowed after iteration n of processing prior to transrating.

$data_n$ is the number of bits of non-real time data input in iteration n of the bit availability process.

Initially the borrowed bit pool is empty, i.e., $borrowed\_bits_0=0$. On each iteration of the allocation portion of the algorithm a new region of consideration, i.e., sequence of outgoing MTS packets, is calculated such that there is at least one GOP within the region of consideration for each program stream being inserted into the outgoing MTS packets. Iteration n of this portion by definition includes the $n^{th}$ GOP of the video elementary stream in program 1. For each program i, $1<i\leq N$, the ordinal number of the GOP for iteration n, which is always included in the region of consideration, is given by $n_i$ and is defined such that $DTS_i(n_i) < DTS_1(n+1)$ and $DTS_i(n_i+1) > DTS_1(n+1)$, as shown in FIG. 2.

The index of the first MTS packet of the region of consideration for iteration n is $k_n = \ln_1(DTS_1(n) - \text{available\_vbv} - c)$, where available_vbv is the amount of the video buffering verifier, or VBV buffer, available for program 1 after GOP n−1, given in bits, which has been converted to time, assuming a bit rate equal to the bit rate of GOP n−1 for program 1, and c is a constant equal to $BS_{mux} + BS_{oh}$, which are defined in Section 2.4.2.3 of ISO 13818-1. This assures that the GOP n is transmitted in a timely manner to the decoder so it arrives prior to when it needs to be decoded according to $DTS_1(n)$. The exact value for $k_n$ must not be greater than $\ln_1(DTS_1(n) - \text{available\_vbv})$ and cannot be any less than the index of the last MTS packet of GOP n−1 for stream 1.

The last MTS packet of the region of consideration for iteration n is $p(k_n+m_n-1)$ where $k_n+m_n = \max\{\ln_1(DTS_1(n+1)\}$. Thus there are $m_n$ MTS packets for consideration in the time interval with respect to the output clock of length $t(k_n+m_n) - t(k_n)$. A given region of consideration with m MTS packets has 1504·m bits associated with it. The GOPs to be allocated to iteration n are the following: GOP n of the video elementary stream in program 1; and GOPs $n_{i-1}+1$ through $n_i$ of the video elementary stream in program i, $1 < i \leq N$. The available bits are the bits in the region of consideration less the following bits:

All of the bits in MTS packets for audio, PSI, etc. in the region of consideration not carrying video or non-real-time data.

All of the header bits for TS packet headers and PES packet headers in the MTS packets with video in the region of consideration.

Bits that have already been committed—those associated with any GOP j of stream i such that $\ln_i(DTS_i(j)) < k_n$.

Bits of GOPs partially contained in the region of consideration which will be completely contained in some future region of consideration, i.e., any GOP j of stream i such that $j > n_i$. For any program i the average GOP size for stream i seen so far is used. If necessary up to some fraction of these bits may be borrowed, i.e., put into the borrowed bit pool, as described below.

For non real-time data all of the bits of size $data_n$ may be borrowed. The data not sent whose size is added to the borrowed bits is queued.

If the number of available, or target, bits in iteration n is T and the total number of bits of the GOPs to be allocated is A, then if T is not less than A the process is done since there is space to fit all of the GOPs. In addition T−A bits from the borrowed bit pool may be used for dequeued non real-time data and may be removed from the borrowed bit pool. More formally $\text{borrowed\_bits}_n = \max(0, \text{borrowed\_bits}_{n-1} - (T-A))$. However if T is less than A and there are bits in the borrowed bit pool, then up to a T bits may be borrowed to increase T. A reasonable value for $\alpha$ is 0.1. The number of bits which may be borrowed becomes $\text{potential\_bits}_n = data_n + \alpha T$.

An allocation function is used to assign bits to programs. Let $a_i$ be the number of actual bits for program i, $\Sigma a_i = A$, and $t_i$ be a target number for program i, $\Sigma t_i \leq T$. An allocation function, $f(a_i) = t_i$, is any function such that $\Sigma t_i \leq T$. The simplest allocation function is the uniform allocator $t_i = (T/A)a_i$. An allocation function, the specifics of which depend upon policies of the stat mux, is used to assign an allocation of bits for the GOPs fed to the transrating portion of the algorithm. The input to the transrating portion includes the target bit rate for each GOP to be adjusted, and for each GOP to be adjusted the size and type of every picture in the GOP. In addition the potential number of bits which may be borrowed is passed as $\text{potential\_bits}_n$. In addition to adjusted GOPs, the transrating portion also returns the number of borrowed bits, b, so that $\text{borrowed\_bits}_n = \text{borrowed\_bits}_{n-1} + b$.

Through external control a program may be added or deleted. Programs may also be switched from one video source to another. Logically these changes occur between iterations of the allocation portion of the algorithm. These cases are handled as follows:

Deleting a program. The allocation function is adjusted to spread the bits over one less program. The value of N is decremented by one. If program 1 is deleted, then a new program 1 is nominated.

Adding a program. The value of N is incremented by one. The index of the new program becomes the new value of N and the function $\ln_N(t)$ is defined such that $\ln_N(DTS_N(n_N))$ is assigned to $k_n+m_n$. The allocation function is adjusted to spread the bits over one additional program.

Change of source. Program j changes from one video source to another, either indicated through external means, through a PSI table change or through a discontinuity indicator, and the transrating function is notified of the change. The function $\ln_j(t)$ is redefined such that $\ln_j(DTS_N(n_N))$ is assigned to $k_n+m_n$. The allocation function remains the same.

Figure 3:
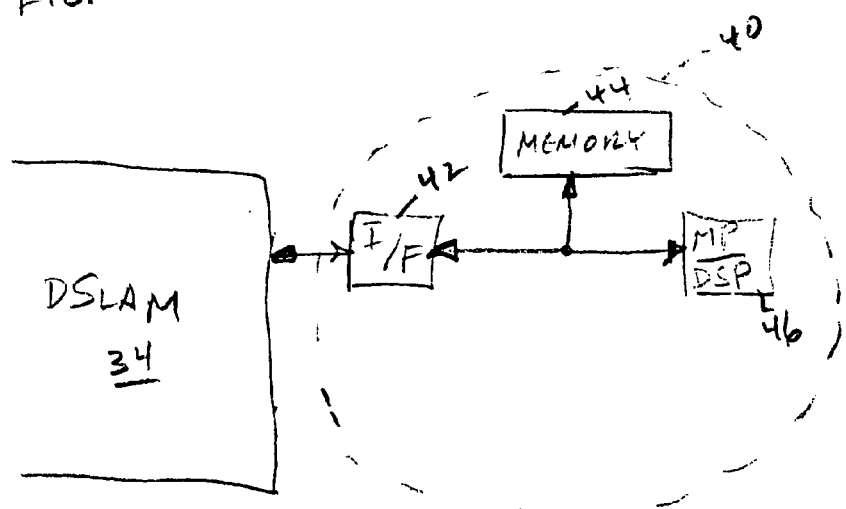
FIG. 3 is a block diagram view of a module for use with a digital subscriber line access multiplexer for bandwidth optimization according to the present invention.
Figure 2:
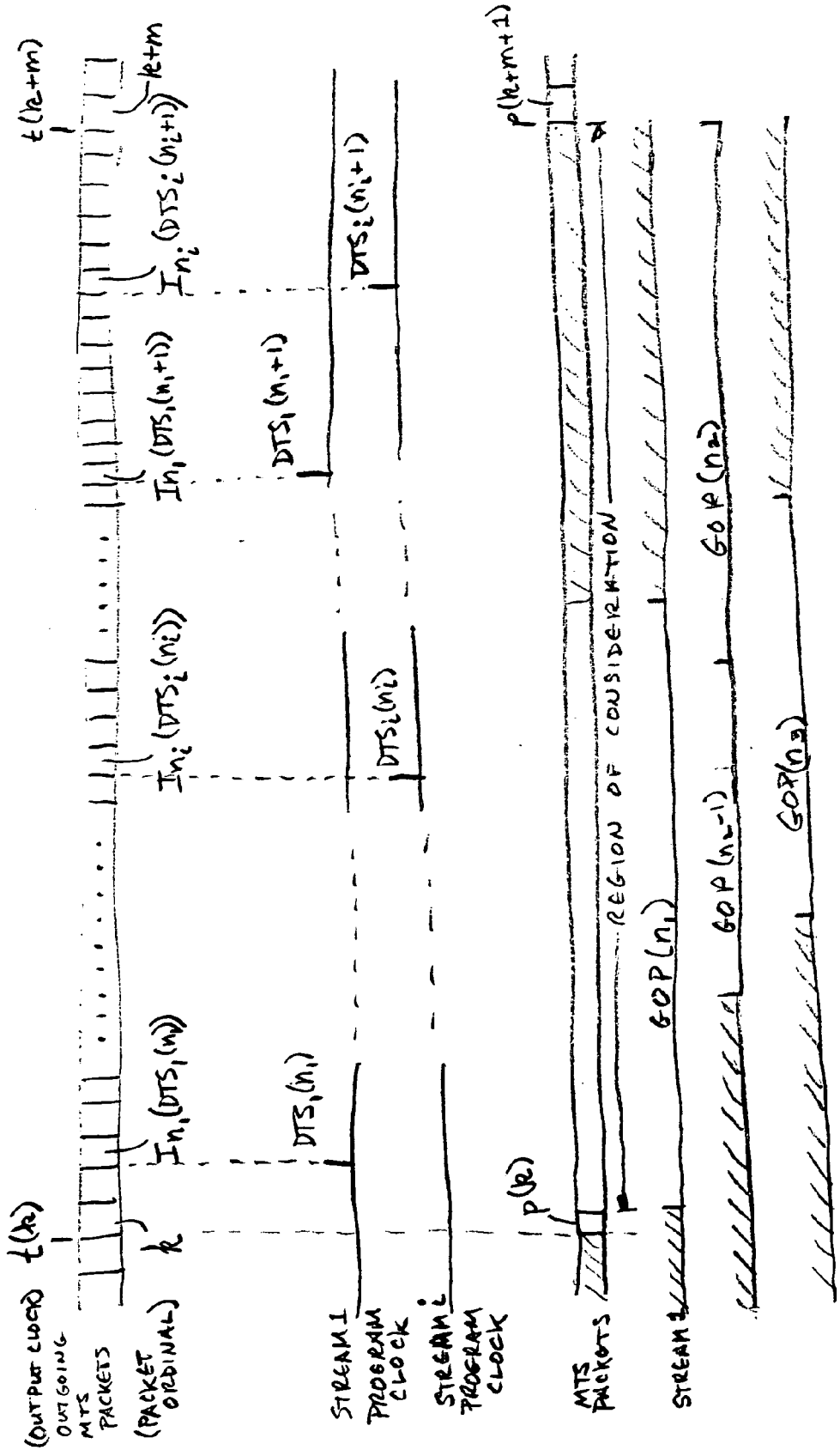

The program streams to be inserted into the outgoing MTS packets are transferred through the DSLAM 34 to a transrating module 40 via an interface 42 to a memory 44, where they are stored in N individual input buffers. In the following description N is assumed to be 3, as an example. The input buffers are labeled IBA, IBB and IBC respectively. A transrating controller 46 takes JA, JB and JC pictures from the respective input buffers for analysis according to the transrating portion of the algorithm, as shown in FIG. 3. JA, JB and JC are application dependent parameters. The larger JA, JB and JC are, the better the performance of the transrating module 40 is. The upper limits of JA, JB and JC are subject to delay restrictions. The lower limits are JA>=MA+1, JB>=MB+1 and JC>=MC+1, where MA, MB and MC are numbers of pictures in an MPEG2 sub-GOP, i.e., the distance between P pictures in the respective video streams. The three video signals A, B, C are analyzed by the transrating controller 46, which may be a microprocessor/digital signal processor (MP/DSP), to determine what, if any, transrating is required before passing the video program streams to the subscriber.

A segment of a video program stream may be handled in one of three different ways during transrating: pass through; rate reduction in the compressed stream domain; or rate reduction in the pixel domain by a decoder-encoder cascade.

Figure 4A:
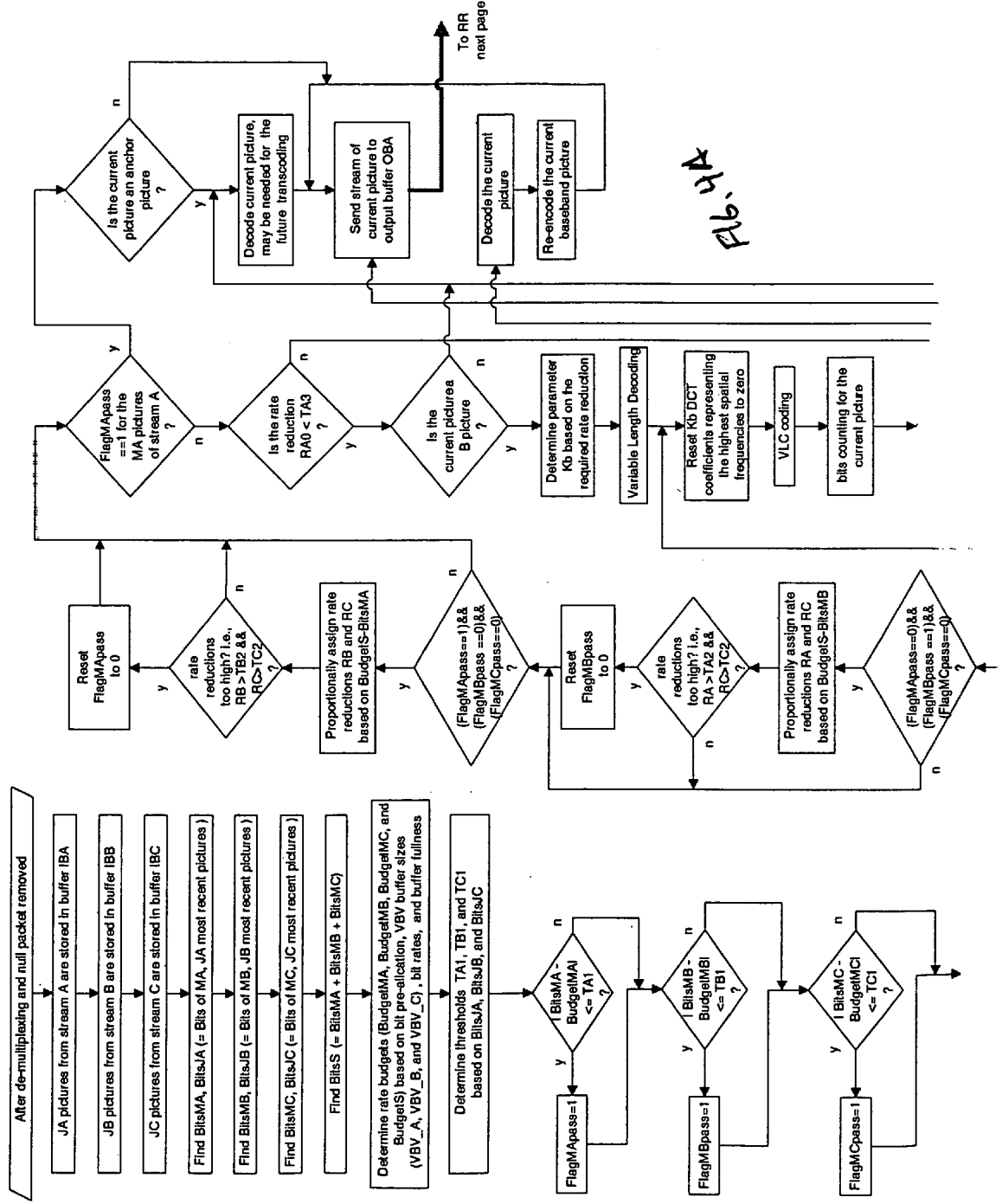
FIG. 4 is a flow diagram view of a process for transrating three program streams according to the present invention.
Figure 9B:
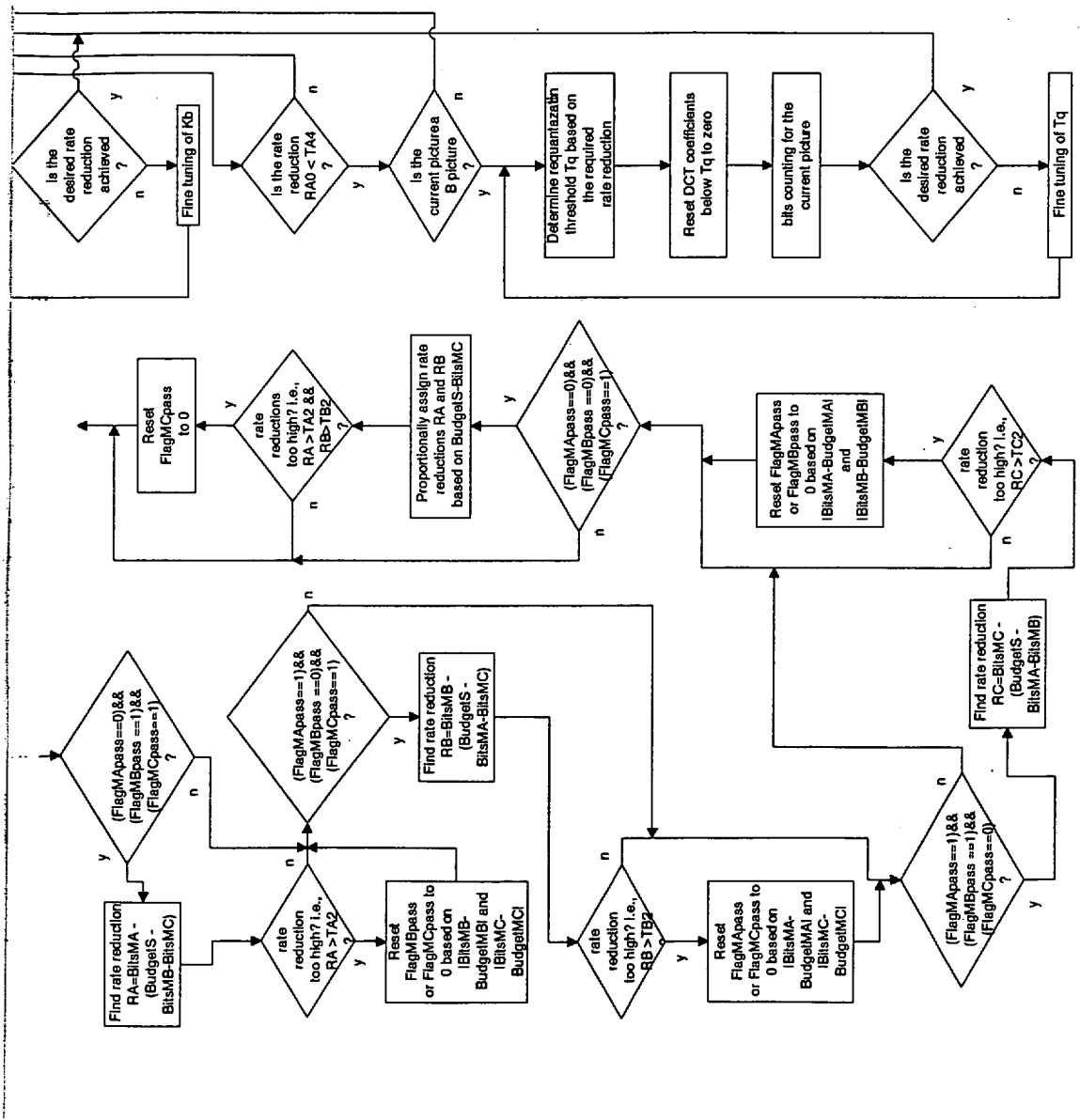
Figure 4C:
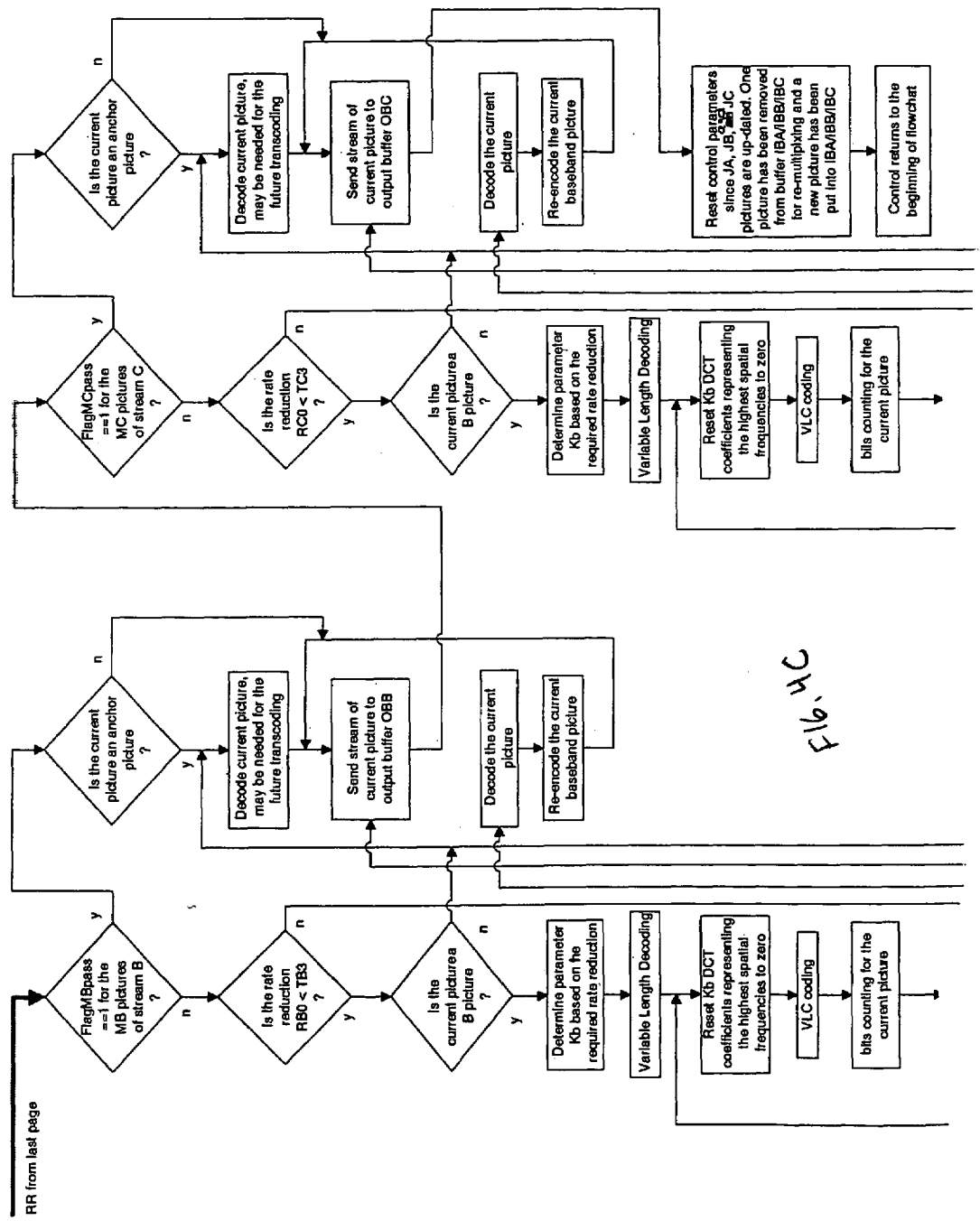

Initially, as shown in FIG. 4, a given number of pictures from each of the compressed video streams A, B and C is stored in respective input buffers IBA, IBB and IBC. The bit rates of MA, MB and MC pictures from each of the JA, JB and JC pictures in the input buffers are calculated, BitsMA, BitsMB and BitsMC, as well as the bit rates for JA, JB and JC, BitsJA, BitsJB and BitsJC and the total bit rate, BitsS=BitsMA+BitsMB+BitsMC. A rate budget BudgetMA, BudgetMB, BudgetMC and BudgetS for each video stream and the total of the video stream may be found from targets defined earlier, but need to be readjusted based on decoder input buffer sizes VB_A, VB_B and VB_C, bit rates and buffer fullness, i.e., BudgetMA=1/2VBV_A+

(desired bit rate for stream A after transrating)$\Delta MA$/PA−VBV_A fullness where PA is the picture rate of stream A, VBV_A is the output buffer of the transcoder for stream A (equal to the input buffer of the decoder at the end), etc., and BuudgetS=BudgetA+BudgetB+BudgetC. If the above calculated budget is higher than target+potential_bits$_n$, then the budget is readjusted to be below target+potential_bits$_n$. Initial thresholds TA1, TB1 and TC1 are determined based on the budgets and rates of the JA, JB and JC pictures, i.e., they are adjustable parameters representing tolerances of mismatch between BitsMA and BudgetMA, BitsMB and BudgetMB, and BitsMC and BudgetMC. For example the transcoder control foresees the bit rate of pictures MA+1, MA+2, . . . , MA+(JA−MA); if the rate is higher or lower than expected, then threshold TA1 is set lower/higher accordingly.

If the mismatch between BitsMA and BudgetMA is within the tolerant range, then a FlagMApass is set to one to indicate that the transrating control is going to let the stream of MA pictures pass through without rate reduction. This flag represents a temporary status as the transrating control may change the status under other conditions as described below. If any one and only one of the flags, such as FlagMApass, is still at zero, representing an out of tolerance condition with respect to the corresponding budget, then a rate reduction ratio RA for that stream is determined as RA=BitsMA−(BudgetS−BitsMB−BitsMC). If RA is greater than a second threshold TA2, i.e., too high, the quality of stream A will be degraded beyond the tolerant range since only the one stream is being transrated. If the rate reduction ratio is too high, then one of the other video signals has its flag reset to zero based on the smallest mismatch between the bit rate and bit rate budget. Threshold TA2 is an application dependent and adjustable parameter representing the tolerance range of video quality degradation.

With two flags set to zero the rate reduction ratios for the two corresponding videos is proportionally assigned based on the total budget. For example if FlagMApass and FlagMBpass are reset to zero while FlagMCpass is set, rate reduction RA+RB=(BitsMA+BitsMB)−(BudgetS−BitsMC). The rate reductions RA and RB are assigned proportionally for streams A and B. If RA and RB are too high, as compared to the respective second thresholds TA2 and TB2, video quality of streams A and B will be degraded beyond the tolerant range. To avoid that, FlagMCpass is reset to zero.

If FlagMApass is set and the current picture from MA recent pictures of stream A is an anchor frame, i.e., an I or P frame, the current picture is decoded. This decoded baseband signal may or may not be used later for future transcoding. It is possible that future pictures will be transcoded in the pixel domain, in which this baseband picture will be needed. If the current picture is not an anchor picture, send the stream of the current picture to an output buffer OBA in the memory of the transrating module, i.e., the stream simply passes through.

If FlagMApass is not set, rate reduction is required. Also stream B and/or stream C may need to be transrated, so the rate reduction RA0 for the MA picture is proportionally assigned. If the rate reduction is small, it is implemented in the compressed stream domain, otherwise it is implemented in the pixel domain by a decoder-encoder cascade. This decision is based on the TRUE or FALSE value of RA0<TA3, where TA3 is a third threshold that is an adjustable and application dependent parameter representing the trade-off between speed of transrating and uniformity of video quality degradation at different spatial frequencies.

If the current picture is a B picture, a picture-wise parameter Kb is proportionally determined based on the required rate reduction. After variable length decoding, the Kb DCT coefficients representing the highest spatial frequencies are reset to zero in every block to reduce the picture rate. The total number of DCT coefficients generally is 64 in an 8×8 block. Some of these coefficients may have zero value. If some of the Kb coefficients are already zero in a DCT block, then less than Kb coefficients are reset to zero, where Kb is an upper limit which is subject to the restriction of uniformity of video quality degradation at different spatial frequencies. After reset of the Kb highest spatial frequency coefficients, the transcoder controller does VLC coding and calculates a new picture rate. If the new rate is not close to the desired rate, the transcoder controller jumps back to modify the Kb parameter and the loop starts again until the desired rate reduction is achieved. The parameter Kb is a picture-wide constant and varies from B frame to B frame. To avoid noticeable unbalance of video quality between B pictures and anchor pictures, the transcoder controller avoids improperly selecting a large Kb such that the rate reduction for the B picture is within TA3. If the rate reduction is above TA3 but less than another threshold, TA4, requantization is implemented on the B picture, i.e., any DCT coefficients below a threshold Tq are reset to zero. Tq is iteratively adjusted until the desired rate reductin is achieved.

If the rate reduction requirement is higher than TA4, a decoder/encoder cascade in the pixel domain is used for transrating for one, two or three segments of the stream. Since the stream data segments are pre-stored in the three input buffers, the buffers are long enough for the transcoder controller to foresee the possible speed problem and try to avoid transrating all three segments of the streams in the pixel domain, which may require a greater speed than the processor can handle. The buffers help to relax the peak speed requirement by reducing rate more than the current need to make buffer occupancy low enough to relax a coming peak rate reduction requirement, or by dumping more bits into buffers than desired at peak if pictures after this peak are low rate pictures, i.e., not to reduce the peak rate at high ratio so that the transrating does not have to be done in the pixel domain.

If it is inevitable to transrate all three segments of the stream in the pixel domain, the transcoder controller may complete the peak rate reduction in longer than the desired period of time without causing loss of sync since pictures dumped into output buffers are fetched after a delay, as described in co-pending U.S. patent application Ser. No. 09/535,676 filed Mar. 23, 2000 by Mayer Schwartz et al entitled "Demultiplexing a Statistically Multiplexed MPEG Transport Stream into CBR Single Program Transport Stream." Once a picture has passed through or been transrated, it is moved to the output buffer, a new picture is loaded into the input buffer, and the control parameters are reset. The process continues for the next picture in each video stream.

If one of the video streams is a priority video signal, such as an active sports event where the bit rate takes most of the pipe, i.e., average bit rate of 4 Mbps or greater, then the other two video streams may be suppressed by the subscriber profile and not displayed to the subscriber while the sports video is selected for primary viewing. At the time of a service request by the subscriber where the subscriber requests up to three program streams:

(a) if three streams are being received and the subscriber tunes to a sport or pay-per-view (PPV) channel, the subscriber is given the choice of viewing the channel at the available bit rate or "bumping" one of the other program streams to obtain the improved bit rate; or (b) if fewer than three program streams are being received and one is a high demand service, such as sports or PPV, then that stream would use the higher bit rate and an additional program stream would be precluded from being added to this subscriber mix until the high demand channel is relinquished.

These modes may be elective in most cases and configured by the subscriber in a settop box (STB) to establish the subscriber profile, and would be communicated to the algorithm of the present invention.

Thus the present invention provides rate and delivery time multiplexing for bandwidth optimization within a constant bit rate pipe by first allocating the number of bits for each group of pictures and transrating the pictures in the group of pictures where the total number of bits for the group of pictures within a region of consideration is greater than a total number of available bits after allowing for bit borrowing. The transrating may occur in the compressed domain where the bit reduction is small, either by zeroing the highest spatial frequency coefficients or by requantization, or in the pixel domain by transcoding where the bit reduction is high.

What is claimed is:

1. A method of bandwidth optimization for a constant bit rate packetized transport stream having N program streams, each program stream being broken into groups of pictures, comprising the steps of:
   determining a number of available bits for each group of pictures from each program stream;
   inserting each group of pictures into the constant bit rate packetized transport stream when the number of bits for said group of pictures is less than or equal to the number of available bits for said group of pictures; and
   transrating each group of pictures when the number of bits in said group of pictures is greater than the number of available bits for said group of pictures so that the total number of bits in the groups of pictures is less than or equal to the total number of available bits; and
   inserting each transrated group of pictures into the constant bit rate packetized transport stream.

2. The method as recited in claim 1 wherein the determining step comprises the steps of:
   selecting a region of consideration to include at least one complete group of pictures from each of the program streams;
   determining the total number of bits for the complete groups of pictures within the region of consideration;
   comparing the total number of bits with an initial number of available bits for the region of consideration;
   borrowing bits for addition to the initial number of available bits if the total number of bits is greater than the initial number of available bits to obtain a total number of available bits, and
   allocating the total number of available bits among the groups of pictures in the region of consideration as the number of available bits for each group of pictures.

3. The method as recited in claim 2 wherein the borrowing step comprises the steps of:
   placing a number of data bits available within the region of consideration into a borrow bit pool; and
   adding bits from the borrow bit pool to the initial number of available bits until the total number of available bits equals the total number of bits or the bits in the borrow bit pool are exhausted.

4. The method as recited in claim 2 wherein the borrowing step comprises the steps of:
   determining a number of bits to borrow from a next region of consideration;
   placing the determined number of bits into a borrow bit pool; and
   adding bits from the borrow bit pool to the initial number of available bits until the total number of available bits equals the total number of bits or the bits in the borrow bit pool are exhausted.

5. The method as recited in claim 4 wherein the borrowing step further comprises the step of placing a number of data bits available within the region of consideration into the borrow bit pool prior to the adding step.

6. The method as recited in claim 2 wherein the allocating step comprises the step of reducing the number of available bits for each group of pictures within the region of consideration by an equal percentage until the total number of available bits for the groups of pictures equals the total number of available bits within the region of consideration.

7. The method as recited in claim 2 wherein the allocating step comprises the steps of:
   identifying a priority program among the program streams; and
   reducing the number of available bits for each group of pictures except those within the priority program by an equal percentage until the total number of available bits for the groups of pictures equals the total number of available bits for the region of consideration.

8. The method as recited in claim 1 wherein the transrating step comprises the steps of:
   determining a rate reduction amount for each program stream;
   comparing the rate reduction amount with a first threshold for each program stream;
   performing transrating in a compressed domain for the program streams where the rate reduction amount is less than a specified value; and
   performing transrating in a pixel domain for the program streams where the rate reduction is more than the specified value.

9. The method as recited in claim 8 wherein the transrating step further comprises the steps of:
   deleting a program stream from the outgoing MTS if specified by a subscriber profile when the rate reduction amount is so high as to cause unacceptable degradation; and
   repeating the above steps for the reduced number of program streams.

10. The method as recited in claim 8 wherein the performing transrating in the compressed domain step comprises the steps of:
    zeroing high spatial frequency coefficients if the rate reduction amount is less than a first threshold for the specified value; and
    requantizing the coefficients if the rate reduction amount is greater than the first threshold and less than a second threshold for the specified value, transrating in the pixel domain occurring when the rate reduction amount if greater than the second threshold.

11. A method of operating a network having a wide bandwidth backbone and a narrower bandwidth branch from the backbone to an end user location for delivering a constant bit rate packetized transport stream to the end user location, said method comprising:

selecting N transport streams each composed of groups of pictures, determining a number of available bits for each group of pictures from each program stream, and if the number of bits for each group of pictures of a program stream is less than or equal to the number of available bits for a group of pictures of that stream, inserting the group of pictures into the constant bit rate packetized transport stream, else transrating the group of pictures so that the number of bits for the transrated group of pictures is less than or equal to the number of available bits for a group of pictures of that stream, and inserting the transrated group of pictures into the constant bit rate packetized transport stream, whereby use of the bandwidth of the network branch is optimized.

12. The method as recited in claim 11 wherein the determining step comprises the steps of:

selecting a region of consideration to include at least one complete group of pictures from each of the program streams;

determining the total number of bits for the complete groups of pictures within the region of consideration;

comparing the total number of bits with an initial number of available bits for the region of consideration;

borrowing bits for addition to the initial number of available bits if the total number of bits is greater than the initial number of available bits to obtain a total number of available bits, and allocating the total number of available bits among the groups of pictures in the region of consideration as the number of available bits for each group of pictures.

13. The method as recited in claim 12 wherein the borrowing step comprises the steps of:

placing a number of data bits available within the region of consideration into a borrow bit pool; and adding bits from the borrow bit pool to the initial number of available bits until the total number of available bits equals the total number of bits or the bits in the borrow bit pool are exhausted.

14. The method as recited in claim 12 wherein the borrowing step comprises the steps of:

determining a number of bits to borrow from a next region of consideration;

placing the determined number of bits into a borrow bit pool; and adding bits from the borrow bit pool to the initial number of available bits until the total number of available bits equals the total number of bits or the bits in the borrow bit pool are exhausted.

15. The method as recited in claim 14 wherein the borrowing step further comprises the step of placing a number of data bits available within the region of consideration into the borrow bit pool prior to the adding step.

16. The method as recited in claim 12 wherein the allocating step comprises the step of reducing the number of available bits for each group of pictures within the region of consideration by an equal percentage until the total number of available bits for the groups of pictures equals the total number of available bits within the region of consideration.

17. The method as recited in claim 12 wherein the allocating step comprises the steps of:

identifying a priority program among the program streams; and reducing the number of available bits for each group of pictures except those within the priority program by an equal percentage until the total number of available bits for the groups of pictures equals the total number of available bits for the region of consideration.

18. The method as recited in claim 11 wherein the transrating step comprises the steps of:

determining a rate reduction amount for each program stream;

comparing the rate reduction amount with a first threshold for each program stream;

performing transrating in a compressed domain for the program streams where the rate reduction amount is less than a specified value; and performing transrating in a pixel domain for the program streams where the rate reduction is more than the specified value.

19. The method as recited in claim 18 wherein the transrating step further comprises the steps of:

deleting a program stream from the outgoing MTS if specified by a subscriber profile when the rate reduction amount is so high as to cause unacceptable degradation; and repeating the above steps for the reduced number of program streams.

20. The method as recited in claim 18 wherein the performing transrating in the compressed domain step comprises the steps of:

zeroing high spatial frequency coefficients if the rate reduction amount is less than a first threshold for the specified value; and requantizing of the coefficients if the rate reduction amount is greater than the first threshold and less than a second threshold for the specified value, transrating in the pixel domain occurring when the rate reduction amount if greater than the second threshold.

\* \* \* \* \*